(12) United States Patent
Conklin et al.

(10) Patent No.: US 10,653,080 B2
(45) Date of Patent: May 19, 2020

(54) HYBRID IRRIGATION TUBING

(71) Applicant: RESPONSIVE DRIP IRRIGATION, LLC, Bradenton, FL (US)

(72) Inventors: David A Conklin, Bradenton, FL (US); Janice K Gould, Bradenton, FL (US); Tam M Le, Salinas, CA (US)

(73) Assignee: Responsive Drip Irrigation, LLC, Bradenton, FL (US)

( * ) Notice: Subject to any disclaimer, the term of this patent is extended or adjusted under 35 U.S.C. 154(b) by 0 days.

(21) Appl. No.: 16/341,889

(22) PCT Filed: Oct. 14, 2017

(86) PCT No.: PCT/US2017/056695
§ 371 (c)(1),
(2) Date: Apr. 12, 2019

(87) PCT Pub. No.: WO2018/071883
PCT Pub. Date: Apr. 19, 2018

(65) Prior Publication Data
US 2019/0239455 A1  Aug. 8, 2019

Related U.S. Application Data

(60) Provisional application No. 62/408,341, filed on Oct. 14, 2016.

(51) Int. Cl.
| | | |
|---|---|---|
| *A01G 25/02* | (2006.01) | |
| *A01G 25/06* | (2006.01) | |
| *B01D 69/04* | (2006.01) | |
| *B01D 71/26* | (2006.01) | |
| *B01D 63/08* | (2006.01) | |
| *B01D 61/14* | (2006.01) | |
| *B01D 63/06* | (2006.01) | |
| *B01D 69/06* | (2006.01) | |
| *B01D 65/02* | (2006.01) | |

(52) U.S. Cl.
CPC ............ *A01G 25/02* (2013.01); *A01G 25/06* (2013.01); *B01D 61/14* (2013.01); *B01D 63/06* (2013.01); *B01D 63/087* (2013.01); *B01D 65/02* (2013.01); *B01D 69/04* (2013.01); *B01D 69/06* (2013.01); *B01D 71/26* (2013.01); *B01D 2311/14* (2013.01); *B01D 2313/12* (2013.01); *B01D 2323/02* (2013.01)

(58) Field of Classification Search
CPC ................................ B05B 1/20; E02B 11/005
See application file for complete search history.

(56) References Cited

U.S. PATENT DOCUMENTS

| | | | | |
|---|---|---|---|---|
| 4,958,770 A | * | 9/1990 | Mitchell | ............... A01G 25/06 239/145 |
| 5,069,388 A | | 12/1991 | Prassas et al. | |
| 7,748,930 B2 | * | 7/2010 | Gesser | ............... A01C 23/042 405/43 |

(Continued)

*Primary Examiner* — Sean D Andrish
(74) *Attorney, Agent, or Firm* — Law Office of Steven R. Olsen, PLLC; Steven R. Olsen

(57) ABSTRACT

Features of relatively low pressure microporous (and preferably plant-responsive) irrigation tubes are combined with features of relatively high pressure drip emitter tubes to produce a hybrid irrigation tube. Methods for using and manufacturing the hybrid irrigation tube are also disclosed.

16 Claims, 9 Drawing Sheets

(56) References Cited

U.S. PATENT DOCUMENTS

| | | |
|---|---|---|
| 2007/0184226 A1 | 8/2007 | Winzeler |
| 2008/0041978 A1* | 2/2008 | Keren .................... A01G 25/02 239/542 |
| 2011/0259969 A1* | 10/2011 | Ruttenberg ............ A01G 25/02 239/1 |
| 2015/0156975 A1 | 6/2015 | Gould et al. |

* cited by examiner

HYBRID IRRIGATION TUBING

BACKGROUND

Field of Invention

The invention relates generally to irrigation systems. More particularly, but not by way of limitation, embodiments of the invention provide a hybrid irrigation tube that includes both microporous membrane and emitter features.

Description of the Related Art

Various types of surface and sub-surface irrigation tubing are known. One shortcoming is that no known irrigation tube performs well for all applications. What is needed is an improved irrigation tube that can meet a wider range of operational conditions.

SUMMARY OF THE INVENTION

In embodiments of the invention, features of relatively low pressure microporous (and preferably plant-responsive) irrigation tubes are combined with features of relatively high pressure drip emitter tubes to produce a hybrid irrigation tube. Methods for using and manufacturing the hybrid irrigation tube are also disclosed. Various alternative embodiments and advantages will be described below.

DETAILED DESCRIPTION

Figure 1:
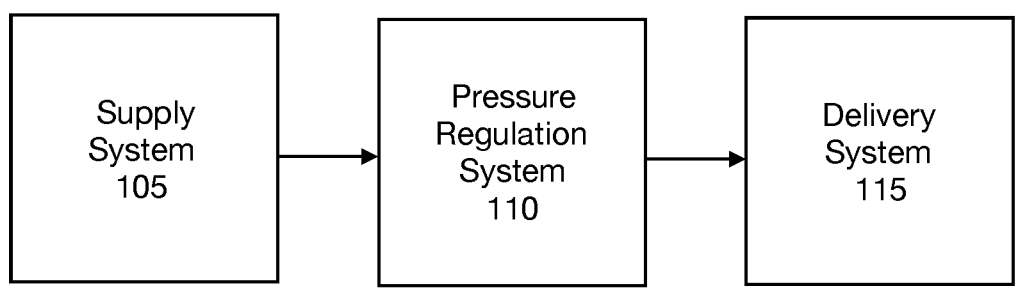
FIG. 1 is a functional block diagram of an irrigation system according to an embodiment of the invention.

Embodiments of the invention are described below with reference to the drawings. Such embodiments are meant to be illustrative and not restrictive. The drawings are not to scale. Certain features illustrated in the drawings may be exaggerated in size, and other features may be omitted altogether, for clarity. Section titles are used below for organizational convenience; but the description of any feature is not necessarily limited to any section of this specification.

Irrigation System Overview

FIG. 1 is a functional block diagram of an irrigation system according to an embodiment of the invention. As shown therein, a crop irrigation system can include a supply system 105, a pressure regulation system 110, and a delivery system 115. The supply system 105 provides water and may also provide fertilizer or other amendments in fluid form; the pressure regulation system 110 controls the pressure (and flow) of the supplied fluids; and the delivery system 115 includes irrigation tubing proximate to crops to deliver the supplied fluids.

As used herein, "tube" and "tubing" broadly refer to one or more fluid conduits (irrespective of cross-sectional shape).

The system partitioning illustrated in FIG. 1 is somewhat arbitrary. For example, features responsible for pressure regulation could be disposed in the supply system 105, delivery system 115, or both the supply system 105 and the delivery system 115.

Identified Shortcomings of Conventional Irrigation Tubing

The inventors recognized that microporous drip tubing (preferably microporous tubing that delivers water according to plant need, also responsive tubing herein) operating at relatively low pressure (for instance less than approx. 3 psi) is generally the most efficient vehicle for delivering water during a plant's growth phase. But higher pressures are required to force amendments through the micropores of such tubing, and extended operation at high pressures can stress seam welds in the microporous drip tubing to failure. In addition, over time and without adequate flush, trace quantities of amendments can crystalize or otherwise clog the microporous structure that is necessary for plant-responsive delivery of water at lower pressure.

Conventional emitter-based irrigation tubing releases fluids at higher pressures, (typically greater than about 3 psi) and can deliver amendments at a relatively high flow rate. But because emitter-based tubing can only operate according to a schedule established by a grower, over-watering or under-watering is common. A hybrid approach that mitigates the limitations of microporous tubing and emitter-based tubing has been developed.

Hybrid Irrigation Tubing Features

Figure 2A:
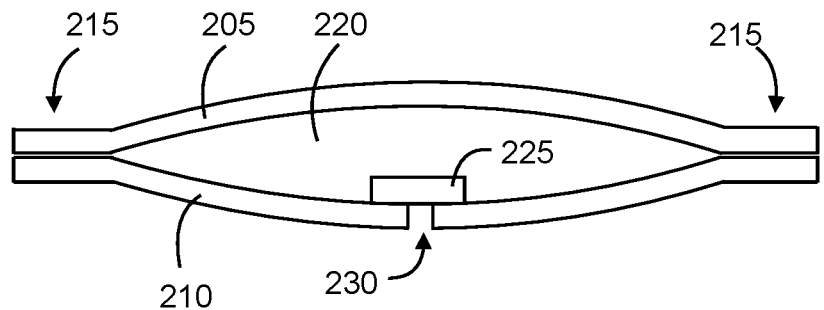
FIG. 2A is a sectional view of a hybrid irrigation tube according to an embodiment of the invention.
Figure 2B:
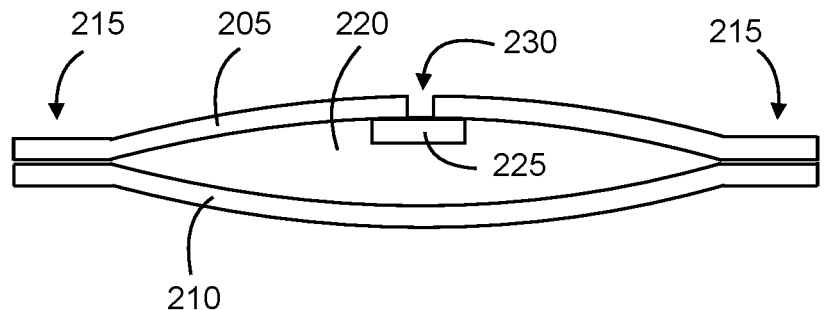
FIG. 2B is a sectional view of a hybrid irrigation tube according to an embodiment of the invention.
Figure 2C:
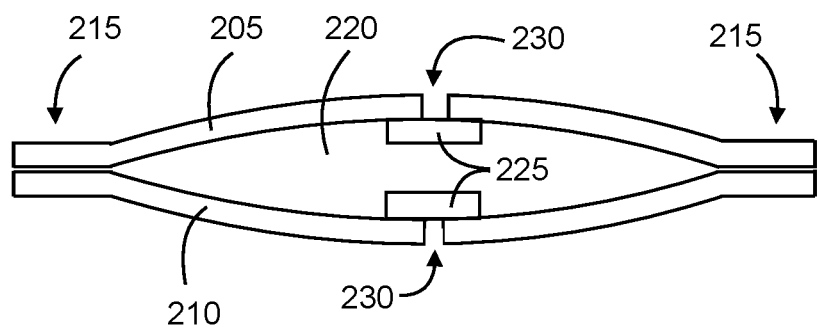
FIG. 2C is a sectional view of a hybrid irrigation tube according to an embodiment of the invention.
Figure 2D:
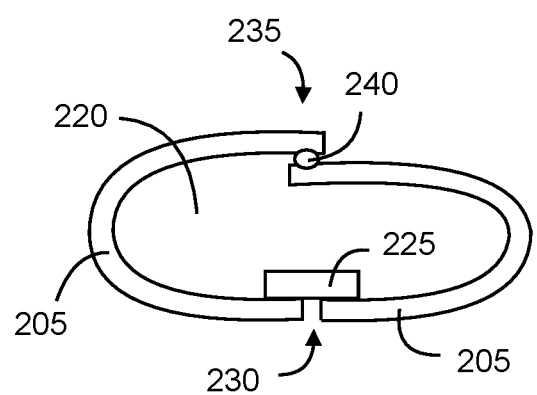
FIG. 2D is a sectional view of a hybrid irrigation tube according to an embodiment of the invention.

In embodiments of the invention illustrated in FIGS. 2A, 2B, and 2C, a microporous membrane 205 is welded along regions 215 to a backer 210 to form a hybrid irrigation tube having a lumen 220. FIG. 2D discloses an embodiment of the hybrid irrigation tube that does not include a backer 210. Instead, the microporous membrane 205 is wrapped upon itself and welded at location 235 with a bead 240.

The microporous membrane 205 may be, for instance, manufactured from polyethylene (PE), polypropylene (PP), or other suitable material. As an example, the microporous membrane 205 may be DuPont Tyvek™ or other non-woven or spun-bonded fabric. Preferably, the microporous membrane 205 is treated (entirely or selectively) with a hydrophilic polymer to enhance responsiveness to root exudate. The backer 210 is preferably a less expensive than the microporous membrane 205. The backer 210 is also preferably much less porous (i.e., effectively non-porous) compared to the microporous membrane 205.

For thermal compatibility, where the microporous membrane 205 is PE, the backer 210 is preferably also manufactured from PE; likewise where the microporous membrane 205 is PP, the backer 210 is preferably PP. The surface area of the microporous membrane 205 and the surface area of the backer 210 need not be equal for any given length of tubing.

Similar tubing structures, and a discussion of responsive membranes, are presented in U.S. Pat. No. 9,527,267, which was granted on Dec. 27, 2016 and is hereby incorporated by reference. In one departure from what is disclosed in U.S. Pat. No. 9,527,267, however, drip emitters 225 are disposed on the backer 210 and/or the microporous membrane 205 to form a hybrid irrigation tube.

In the embodiments illustrated in FIGS. 2A, 2B, 2C, and 2D, each emitter 225 is disposed on an inner wall of the hybrid irrigation tube and is configured to pass fluid from the lumen 220 to an external environment through an exit hole 230 in the hybrid irrigation tubing. In alternative embodiments, however, emitters 225 could be disposed on an exterior surface of the hybrid irrigation tubing. Preferably, each emitter 225 has a predetermined fluid release pressure. Below the specified release pressure, the emitter 225 does not output fluid from the hybrid irrigation tube. Pressure-compensating emitters that maintain a desired fluid flow over a predetermined range of varying pressures may be appropriate for some applications.

Figure 3A:
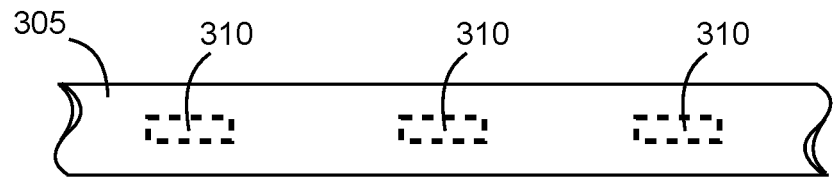
FIG. 3A is a plan view of a hybrid irrigation tube according to an embodiment of the invention.
Figure 3B:
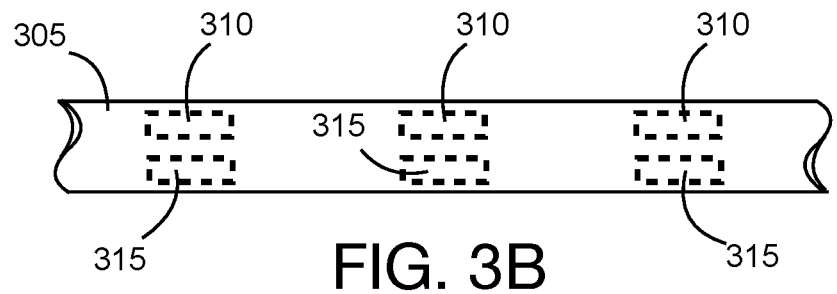
FIG. 3B is a plan view of a hybrid irrigation tube, according to an embodiment of the invention.
Figure 3C:
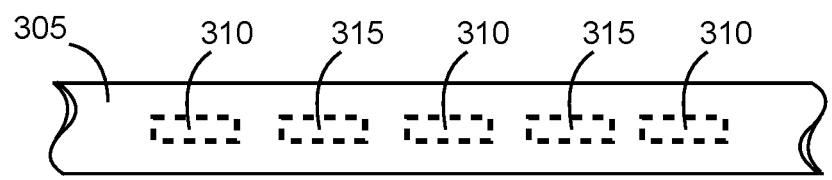
FIG. 3C is a plan view of a hybrid irrigation tube according to an embodiment of the invention.
Figure 3D:
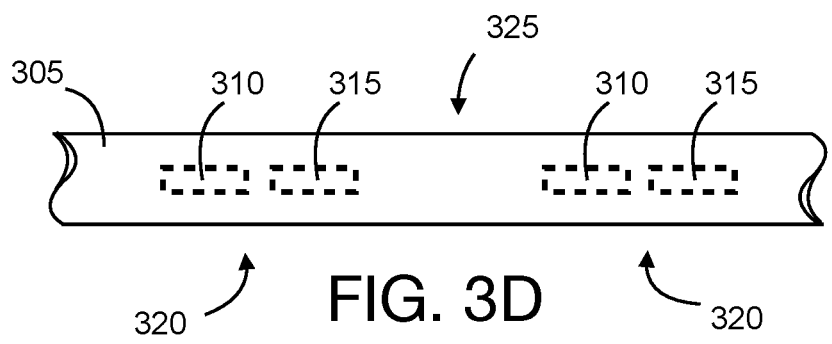
FIG. 3D is a plan view of a hybrid irrigation tube according to an embodiment of the invention.

Emitters can be disposed uniformly along the hybrid irrigation tube, or emitter spacing can vary. Moreover, all emitters may have the same release pressure, or emitters of different release pressures may be used in combination on a single hybrid irrigation tube. Exemplary options are presented in FIGS. 3A, 3B, 3C, and 3D where hybrid irrigation tube 305 includes emitters 310 with a first release pressure and/or emitters 315 with a second release pressure. FIG. 3D illustrates an embodiment where emitter groups 320 are separated by tubing sections 325 that do not contain any emitters. Spacing between individual emitters or between emitter groups can vary according to design choice and may be determined by target crop spacing during cultivation. For instance, emitters could be spaced at 4", 6", 8", 12", or 16" intervals.

Many variations in hybrid irrigation tubing configurations are possible. Features separately illustrated or described with reference to FIGS. 2A, 2B, 2C, 2D, 3A, 3B, 3C, and 3D can be used in many different combinations. Table 1 below further illustrates at least some of the alternative embodiments that can be constructed, according to application needs.

TABLE 1

| EMBODIMENT | EMITTER LOCATION | EMITTER SPACING DIMENSION | EMITTER RELEASE PRESSURE VALUE |
|---|---|---|---|
| 1 | non-responsive side | single | single |
| 2 | non-responsive side | multiple | multiple |
| 3 | responsive side | multiple | multiple |
| 4 | less responsive side | multiple | multiple |

In Table 1, "non-responsive side" refers to backer 210; "responsive side" refers to a microporous membrane 205 treated with a hydrophilic polymer; "less responsive side" means a microporous membrane 205 with no hydrophilic polymer coating or with less hydrophilic polymer coating than the "responsive side" option.

Application Example #1

In the example summarized in Table 2, below, a hybrid irrigation tube includes multiple emitters with a common release pressure. A microporous membrane 205 that is treated with a hydrophilic polymer is configured to operate in a plant-responsive mode from about 1.5-3 psi, and each of the emitters has a release pressure of 3 psi.

TABLE 2

| OPERATING PRESSURE (psi) | RESPONSIVE MEMBRANE FUNCTION | 3 psi EMITTER FUNCTION | APPLICATION MODE |
|---|---|---|---|
| 1.5 | responsive | closed | irrigate |
| 2.5 | responsive | closed | irrigate |
| 3.5 | open | open | exception* |
| 4.5 | open | open | exception* |

*The exceptional application mode could be, for instance, adding fumigant, chemicals, or other amendments, or flushing the irrigation system.

The hybrid irrigation tube of this first application example overcomes the limitations of pure responsive tubing because the emitters allow for high volume delivery of fumigant, chemicals or other plant amendments. At the same time, the hybrid irrigation tube is highly efficient at watering crops at low pressures.

Application Example #2

In the example summarized in Table 3, below, a hybrid irrigation tube includes emitters with differing release pressures. The microporous membrane 205 of the hybrid irrigation tube is configured to operate in a plant-responsive mode from about 1.5-3 psi. At least one emitter has a release pressure of 3 psi; and at least one other emitter has a release pressure of 6 psi.

TABLE 3

| OPERATING PRESSURE (psi) | RESPONSIVE MEMBRANE FUNCTION | 3 psi EMITTER FUNCTION | 6 psi EMITTER FUNCTION | APPLICATION MODE |
|---|---|---|---|---|
| 1.5 | responsive | closed | closed | irrigate |
| 2.5 | responsive | closed | closed | irrigate |
| 3.5 | open | open | closed | amendment |
| 4.5 | open | open | closed | amendment |
| 5.5 | open | open | closed | amendment |
| 6.5 | open | open | open | flush |
| 7.5 | open | open | open | flush |

Relatively high operating pressures, like those illustrated in Table 3 above, may be necessary, for instance, when a very high flow rate is needed for amendment and/or when field topography necessitates a very high operating pressure for adequate flush.

Method for Using Hybrid Irrigation Tubing

Figure 4:
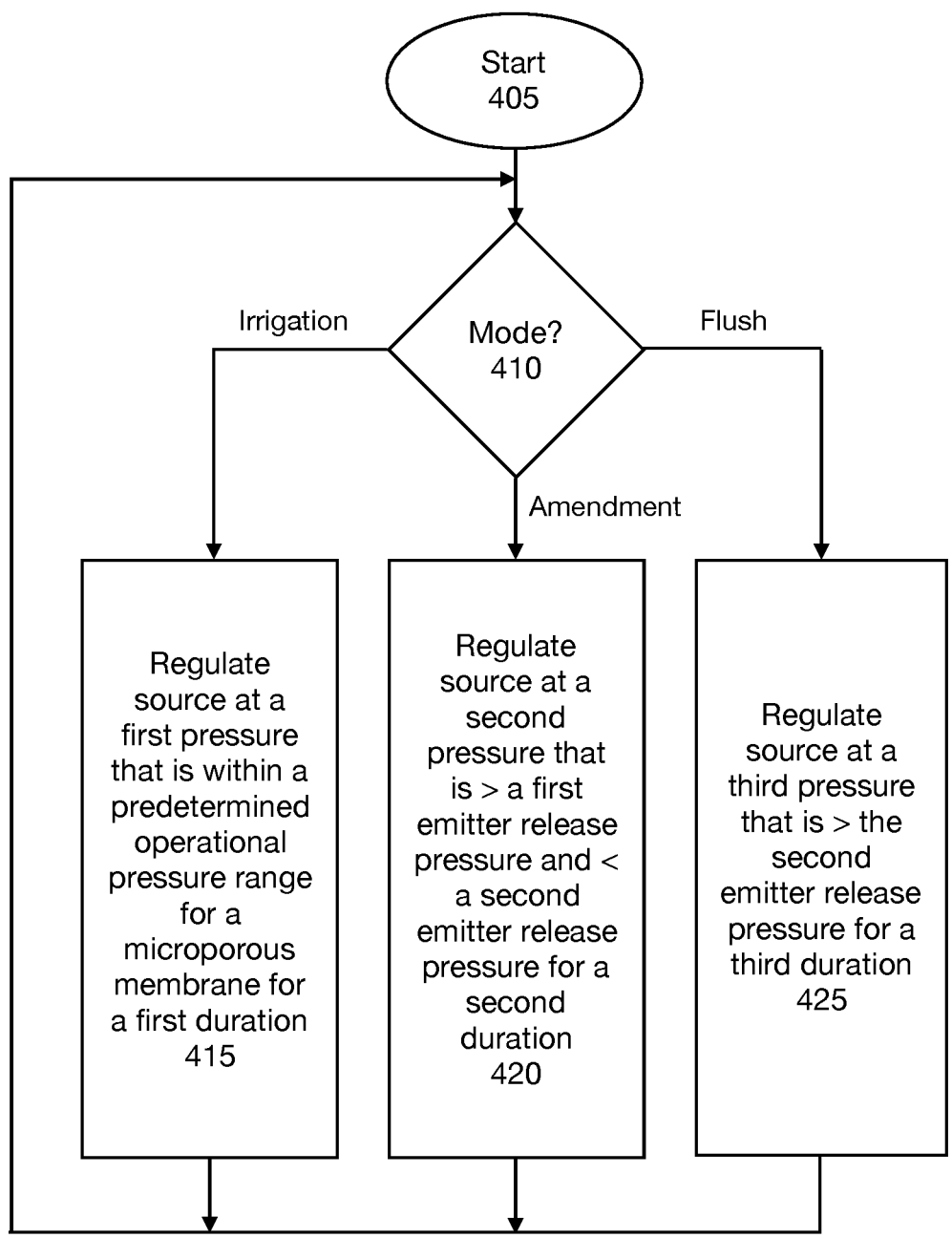
FIG. 4 is a flow diagram of an operational method for hybrid irrigation tubing according to an embodiment of the invention.

FIG. 4 is a flow diagram that more broadly illustrates a method for using a hybrid irrigation tube. The process starts in step 405 and then selects an operational mode in conditional step 410. Selection in conditional step 410 may be based on a predetermined schedule, for instance one that is tailored according to plant type, maturity, and/or location. Alternatively, or in combination, step 410 may be informed by manual or automated observation of crop and/or soil conditions (to determine a need for irrigation or amendment) and hybrid irrigation tubing conditions (to determine a need for flush).

If an irrigation mode is selected in step 410, the process regulates a source fluid at a first pressure that is within a predetermined operational pressure range for a microporous membrane for a first duration in step 415. If an amendment mode is selected in step 410, the process regulates the source fluid at a second pressure that is greater than a first emitter release pressure and less than a second emitter release pressure for a second duration in step 420. If a flush mode is selected in step 410, the process regulates the source fluid at a third pressure that is greater than the second emitter release pressure for a third duration in step 425.

With reference to Application Example #2, the first pressure could be 2 psi, the second pressure could be 4 psi, and the third pressure could be 7 psi.

Typically, the first duration is greater than the second duration, and the second duration is greater than the third duration. Any one or more of the first, second, and third durations could be predetermined. Alternatively, or in combination, any one or more of the first, second, and third durations could be be determined as part of step 410 based to an observational assessment.

In one application of the method described above with reference to FIG. 4, the second pressure operates a first emitter type, and the third pressure operates the first and a second emitter types. In an alternative embodiment, there is one emitter type that includes two thresholds: a first threshold is responsive to the second pressure (for instance to enable an amendment mode), and a second threshold is responsive to the third pressure (for instance to enable a flush mode).

Unexpected Results

Microporous tubing cannot necessarily withstand high-pressure operation over long durations. In a hybrid irrigation tube, however, emitters allow for relatively shorter durations for amendment and flush operations. For example, using hybrid irrigation tubing, an amendment application might only require 1-4 hours, and a flush may require less than 0.5 hours. As a result, there is a decreased risk to the integrity of microporous membranes (and associated seam welds) when emitters are included in irrigation tubing. Hybrid irrigation tubes that include emitters having multiple release pressures may further mitigate against damage to microporous membranes and/or welds by limiting rapid increases in operating pressure within the irrigation tubing.

Pressure Regulation Features

In embodiments of the invention, the operating pressure of an irrigation/fertilization system using hybrid irrigation tubing is manually adjusted according to a desired application mode. In alternative embodiments, operating pressure could be automatically adjusted, for example based on a predicted growth cycle for a particular crop, or according to crop amendment instructions from a smart farming system informed by sensor data.

Figure 5:
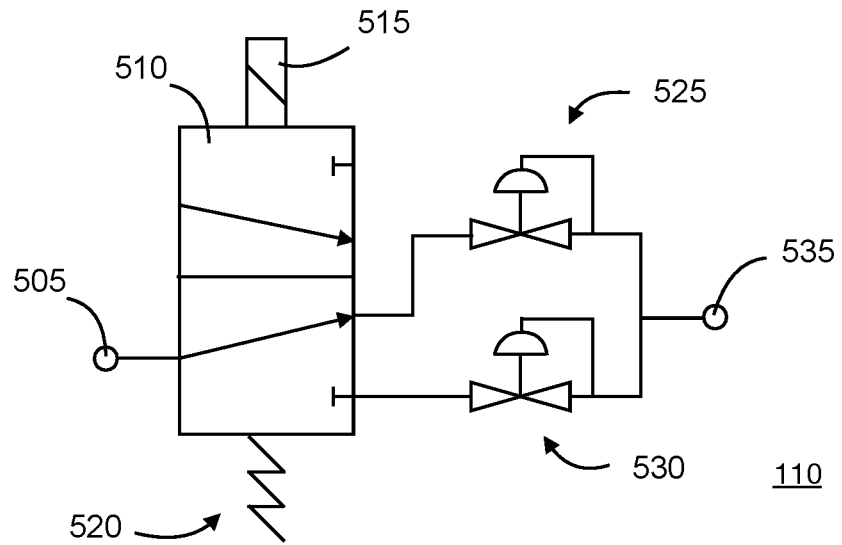
FIG. 5 is a schematic diagram of a pressure regulation system according to an embodiment of the invention.

Exemplary embodiments of pressure regulation system 110 are described below with reference to schematic diagrams in FIGS. 5 and 6. FIG. 5 illustrates a diverter 510 that includes an operator 515 and spring 520. In a first position of the diverter 510 (the position shown in FIG. 5), fluid flow is directed from inlet 505 through a first pressure regulator 525 to outlet 535. In a second position of the diverter 510 (not shown in FIG. 5), fluid flow is directed from the inlet 505 through a second pressure regulator 530 to the outlet 535.

Pressure regulators 525 and 530 could be limited to discrete operational values. For example, the first pressure regulator 525 could be configured to maintain a fluid pressure of 2.5 psi (+/−0.1 psi), whereas the second pressure regulator 530 could be configured to maintain a fluid pressure of 5 psi (+/−0.1 psi). In an alternative embodiment, each of the pressure regulators 525, 530, could be configured to operate over a range of pressure values. For instance, the first pressure regulator 525 could be user-adjustable between 0.5 and 3.0 psi, and the second pressure regulator 530 could be user-adjustable between 3.0 to 15 psi.

Figure 6:
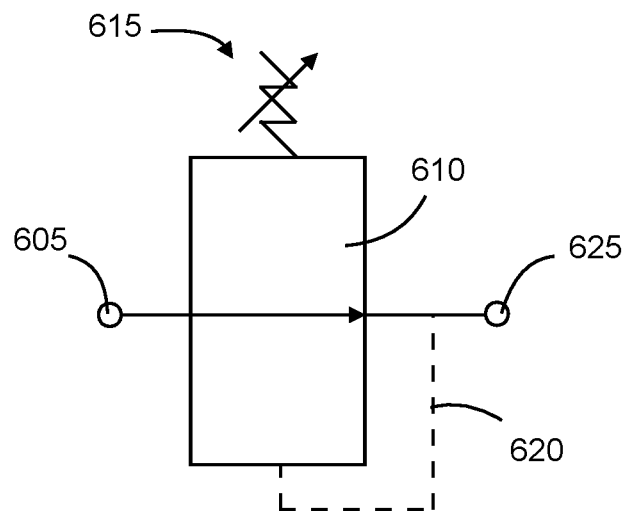
FIG. 6 is a schematic diagram of a pressure regulation system according to an embodiment of the invention.

FIG. 6 illustrates a regulator 610 that includes an adjustable spring 615 and a feedback loop 620. In operation, the regulator 610 receives a fluid flow at inlet 605 and provides a pressure-regulated fluid flow at outlet 625. Preferably, the single regulator 610 is configured to accommodate the full range of required pressure regulation. For instance, the regulator 610 may be user-adjustable between 0.5 psi and 15 psi.

Method for Adjusting Depth of Hybrid Irrigation Tubing

Plants produce roots to gather water and nutrients. A tap root, common to many plants, extends down vertically from a base of the plant. Feeder roots may extend in both vertical and horizontal directions. For drip irrigation, and esp. for responsive drip irrigation, optimal irrigation tube placement during cultivation may be a location that is proximate to a highest concentration of plant roots.

Figure 7A:
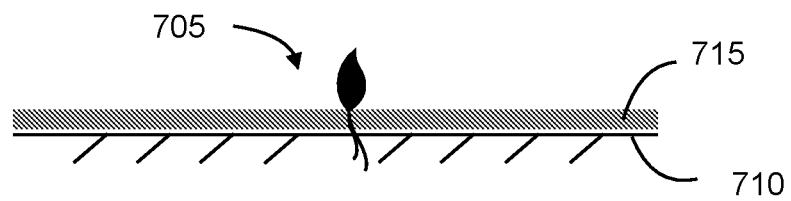
FIG. 7A is an elevation view of a seedling.
Figure 7B:
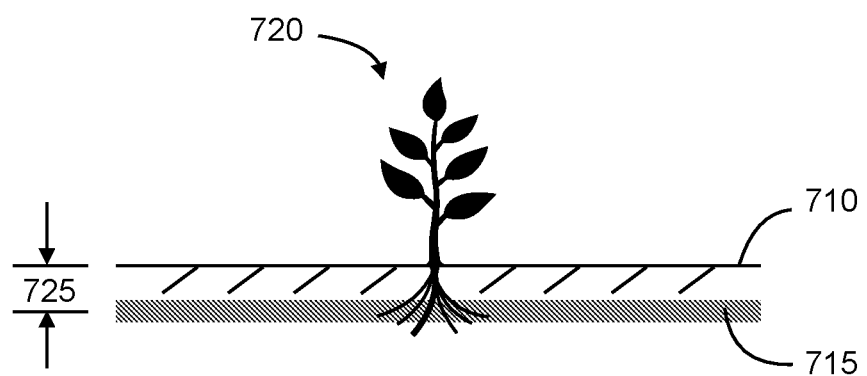
FIG. 7B is an elevation view of a relatively young plant.
Figure 7C:
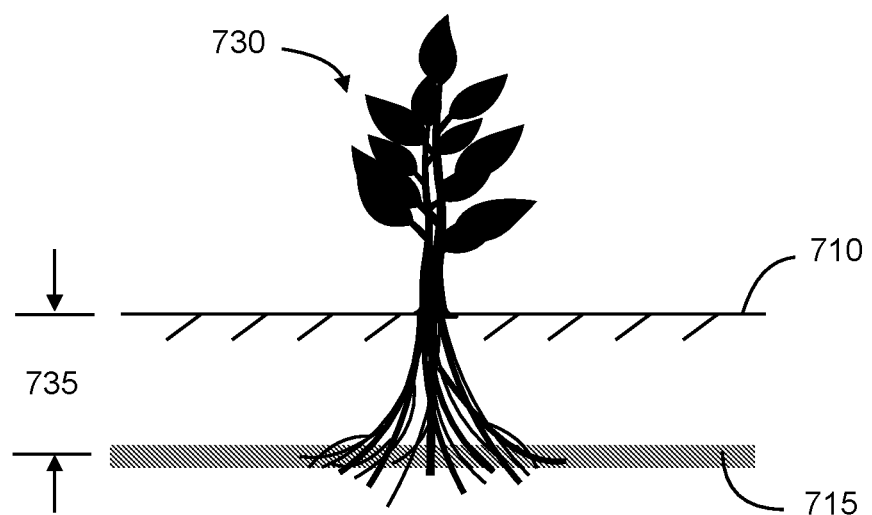
FIG. 7C is an elevation view of a relatively mature plant.

Optimal irrigation tube depth typically changes during a crop's growth cycle, as illustrated with reference to FIGS. 7A, 7B, and 7C. FIG. 7A shows that for a seedling 705, it may be preferable to dispose irrigation tubing 715 on a ground surface 710 (this may also be true for a seed). FIG. 7B illustrates that for a young plant 720, it may be preferable to dispose irrigation tubing 715 at a depth 725 below the ground surface 710. FIG. 7C illustrates that for a mature plant 730, it may be preferable to dispose irrigation tubing 715 at a depth 735 (a depth greater than 725) below the ground surface 710.

Figure 8:
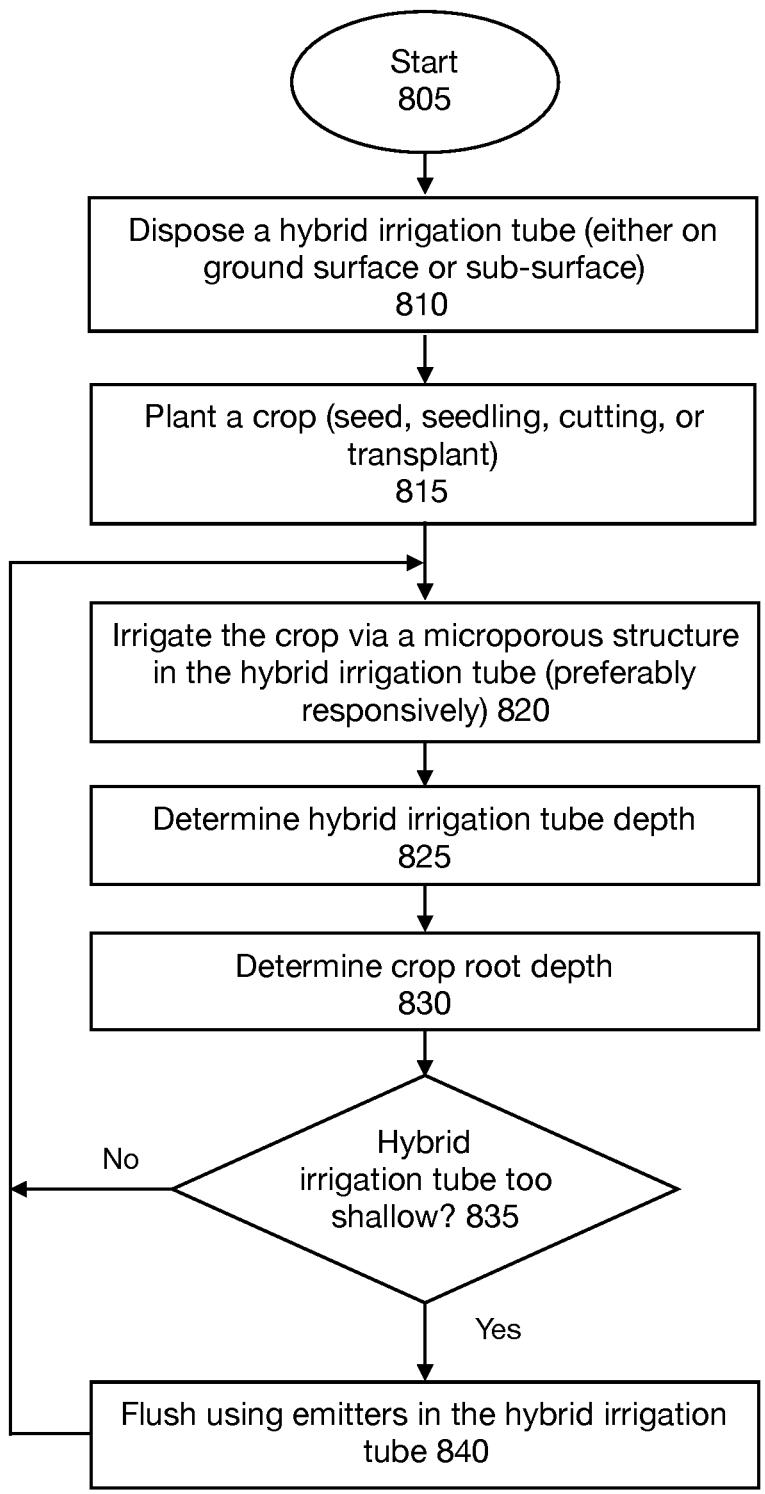
FIG. 8 is a flow diagram of a method for adjusting depth of hybrid irrigation tubing, according to an embodiment of the invention.

FIG. 8 is a flow diagram of a method for adjusting depth of hybrid irrigation tubing, according to an embodiment of the invention. As shown therein, the process starts in step 805, and then disposes a hybrid irrigation tube in step 810. Step 810 could include laying the hybrid irrigation tube on a ground surface or injecting the hybrid irrigation tube sub-surface. Next, in step 815, the process plants a crop (e.g., seed, seedling, or cutting), preferably proximate to the hybrid irrigation tube. In alternative embodiments of the invention, steps 810 and 815 could be performed simultaneously (for example using automated or semi-automated equipment to align crops with emitters). In another embodiment, the order of steps 810 and 815 could be reversed.

The process irrigates the crop via a microporous structure in the hybrid irrigation tube (preferably responsively) in step 820. Next, the process determines a hybrid irrigation tube depth in step 825 and determines a crop root depth in step 830. Steps 825 and 830 are preferably accomplished by observation (for instance on a sample of irrigation tubing and crops, respectively). Crop root depth can be determined in step 830 by measuring depth of a tap root. Alternatively, it may be appropriate to measure depth of a root bundle in step 830. In some applications, it may be possible to adequately estimate crop root depth in step 830 based on crop type, known soil characteristics, weather history, irrigation history, duration since planting, size of the crop above ground, and/or other factors.

In step 835, the process determines whether the hybrid irrigation tube is too shallow for optimal irrigation. Step 835 is based on results obtained in steps 825 and 830, and involves a comparison between hybrid irrigation tube depth and crop root depth. If the hybrid irrigation tube depth is greater than the crop root depth, or if the difference between tube depth and root depth is less than a predetermined threshold (in absolute value, or by percentage), then the process returns to step 820. Otherwise, the process performs a flush using emitters in the hybrid irrigation tube in step 840 for a predetermined duration before returning to step 820. Step 840 has the effect of sinking the hybrid irrigation tube to a lower depth in the ground.

The above-described method for adjusting depth or irrigation tubing is uniquely enabled by hybrid irrigation tubing because microporous membrane features provide the structure for irrigation in step 820, and because higher-flow emitters facilitate manipulation of tube depth in step 840.

The disclosed method for adjusting depth provides more flexibility in how irrigation tubing is installed in the field at (or prior to) time of planting. This is advantageous because, due to labor and machinery costs, shallow sub-surface injection of irrigation tubing is generally less expensive than deep injection of irrigation tubing. Likewise, surface application is typically the least expensive method for installing irrigation tubing.

The process illustrated in FIG. 8 and described above also provides many advantages during cultivation. For example, optimizing the depth of hybrid irrigation tubing can reduce the amount of water and/or amendments required, improve crop yield, and reduce environmental consequences associated with over-watering and/or over-fertilizing.

Method for Manufacturing a Hybrid Irrigation Tube

U.S. Pat. No. 9,527,267, which was granted on Dec. 27, 2016, discloses a manufacturing method for an irrigation tube having a microporous membrane and a backer. The same or similar process (or a disclosed variant) could be used to manufacture a hybrid irrigation tube except that emitter structures must be disposed in the backer and/or responsive membrane.

Figure 9:
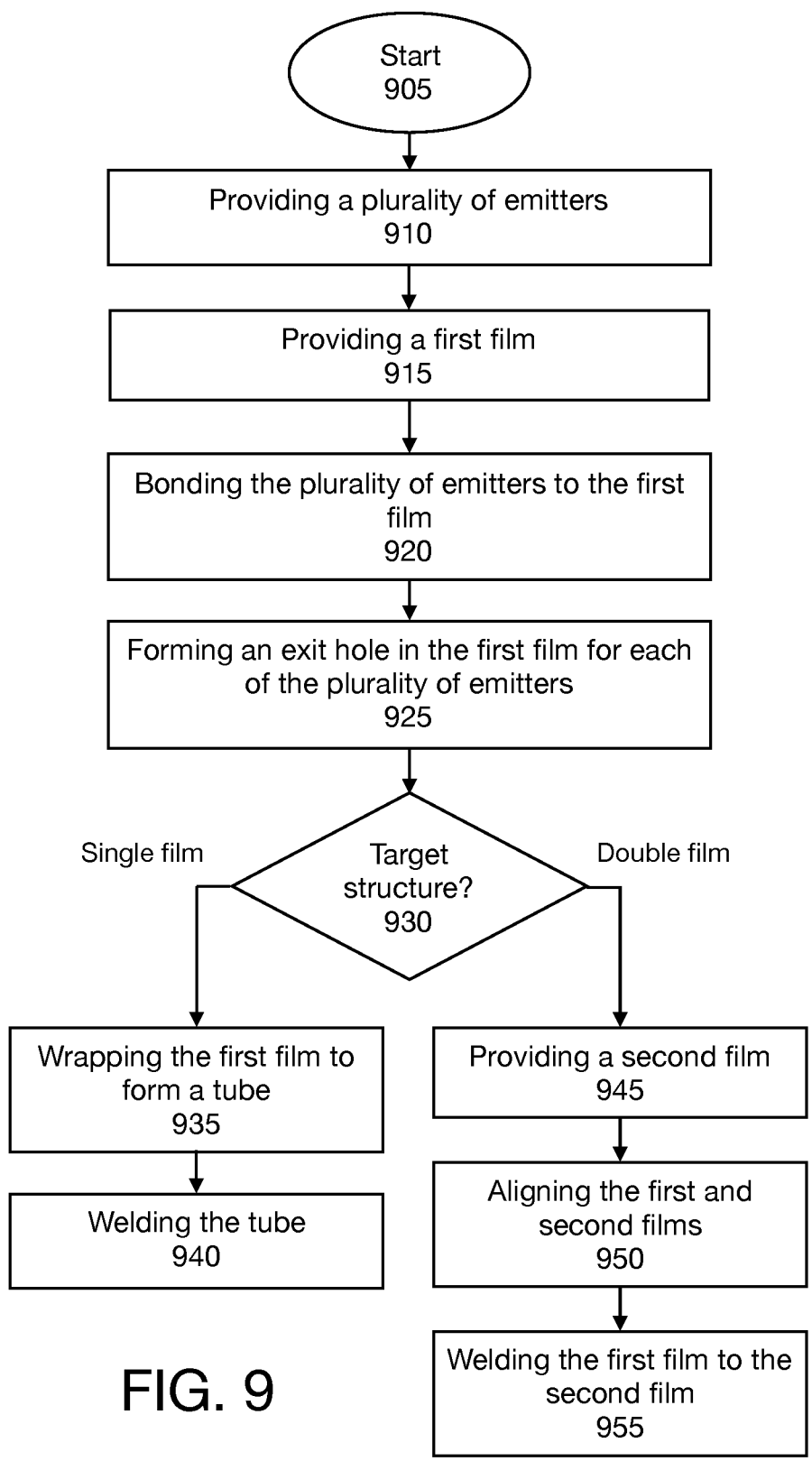
FIG. 9 is a flow diagram of a method for manufacturing hybrid irrigation tubing, according to an embodiment of the invention.

FIG. 9 is a flow diagram of a method for manufacturing hybrid irrigation tubing, according to an embodiment of the invention. As illustrated, the process starts in step 905, and then provides a plurality of emitters in step 910. Step 910 could include, for instance, manufacturing the plurality of emitters via an injection molding process.

Step 915 includes providing a first film. In general, the first film provided in step 915 could either be a microporous membrane (preferably treated at least in part with a hydrophilic polymer) or a substantially non-porous plastic film. Where the target end product is a single-film structure like the one presented in FIG. 2D, however, the first film provided in step 915 must be a microporous membrane. Likewise, where the target end product is a structure like the one presented in FIG. 2B, the first film provided in step 915 must be a microporous membrane. On the other hand, where the target structure is like the one presented in FIG. 2A, the first film provided in step 915 must be a non-porous backer.

The plurality of emitters are bonded to a first side of the first film in step 920, for instance under heat and pressure. Bonding step 920 is preferably performed in line with manufacture of the first film; pressure could be applied by opposing roller drums. In step 925, the process forms a plurality of exit holes from a second side of the first film, each of the plurality of exit holes being in alignment with an emitter outlet. Step 925 could include, for example, mechanical punching or laser cutting.

Conditional step 930 provides a logical branch in the illustrated process flow. Where the target end product is a single-film structure like the one presented in FIG. 2D, the process wraps the first film to form a tube in step 935, and then seam welds the tube in step 940. Although wrapping step 935 preferably disposes the plurality of emitters on an inside surface of the hybrid irrigation tube, wrapping step 935 could be executed to position the plurality of emitters on an outside surface of the hybrid irrigation tube according to design choice.

Where the target end product is like the structure presented in FIG. 2A or 2B, the process provides a second film in step 945 (the second film being a microporous membrane in the case of the structure in FIG. 2A; the second film being a backer in the case of the structure presented in FIG. 2B). The process then aligns the first and second films in step 950, and welds the first film to the second film in step 955. In step 950, the plurality of emitters can alternatively be disposed in the interior of the hybrid irrigation tube or on the exterior of the hybrid irrigation tube, according to design choice.

Variations of the process flow illustrated in FIG. 9 are possible. For example, where the target structure is like the one presented in FIG. 2C, the first film provided in step 915 is a selected one of the microporous membrane and the backer, and the second film provided in step 945 is the other one of the microporous membrane and backer. Also, an additional bonding step and an additional forming step (repeating steps 920 and 925, but operating on the second film) would be inserted, in that same sequence, after providing step 945 and before aligning step 950. Moreover, bonding step 920 and forming step would operate on a first portion of the plurality of emitters; the additional bonding step and the additional forming step would operate on a second portion of the plurality of emitters.

In other embodiments of the hybrid irrigation tubing manufacturing process, each of the plurality of emitters provided in step 910 includes a barb stem, bonding step 920 is eliminated, and each of the plurality of emitters is inserted into an exit hole on an exterior surface of the hybrid irrigation tube subsequent to welding step 940 or 955 (as applicable). Where each of the plurality of barb stems is a self-piercing barb, forming step 925 is also eliminated. The installation of barb-stemmed emitters at a later time, for instance by manual or automated mechanical insertion when hybrid irrigation tubing is being disposed in a field, may be advantageous because rolls of irrigation tubing may be more compact before emitters are installed. In addition, in the case of emitters having self-piercing barbs, the end user retains maximum flexibility as long as possible with respect to emitter spacing.

CONCLUSION

Those skilled in the art can readily recognize that numerous variations and substitutions may be made in the invention, its use and its configuration to achieve substantially the same results as achieved by the embodiments described herein. For example, features described with reference to different embodiments in this application can be combined in ways not expressly described. Accordingly, there is no intention to limit the invention to the disclosed exemplary forms. Many variations, modifications and alternative constructions fall within the scope and spirit of the disclosed invention.

The invention claimed is:
1. A hybrid irrigation tube comprising:
a lumen;

a microporous membrane, micropores of the microporous membrane configured to provide fluid communication between the lumen and an exterior surface of the hybrid irrigation tube;

a non-porous backer, the microporous membrane and the non-porous backer each extending lengthwise on the hybrid irrigation tube, the non-porous backer being connected to the microporous membrane at a first lengthwise weld area and a second lengthwise weld area; and at least one drip emitter disposed in the non-porous backer, the at least one drip emitter configured to provide fluid communication between the lumen and the exterior surface of the hybrid irrigation tube, the microporous membrane having a first operational pressure range for fluid passage, the at least one drip emitter having a second operational pressure range for fluid passage, the first operational pressure range for fluid passage including pressures below the second operational pressure range for fluid passage.

2. The hybrid irrigation tube of claim 1, wherein the microporous membrane includes spun-bonded polyethylene.

3. The hybrid irrigation tube of claim 1, wherein at least a portion of the microporous membrane is treated with a hydrophilic polymer.

4. The hybrid irrigation tube of claim 1, wherein the at least one drip emitter includes:

a first drip emitter having a third operational range for fluid passage; and a second drip emitter having a fourth operational range for fluid passage, each of the third operational range for fluid passage and the fourth operational range for fluid passage being within the second operational range for fluid passage.

5. The hybrid irrigation tube of claim 1, wherein the at least one drip emitter is disposed on an interior surface of the non-porous backer.

6. The hybrid irrigation tube of claim 1, wherein the at least one drip emitter is disposed on an exterior surface of the non-porous backer.

7. A method for manufacturing the hybrid irrigation tube of claim 1, comprising the steps of:

a) providing the at least one drip emitter;

b) providing the non-porous backer;

c) bonding the at least one drip emitter to the non-porous backer;

d) forming an exit hole in the non-porous backer for each of the at least one drip emitter;

e) providing the microporous membrane;

f) aligning the non-porous backer to the microporous membrane; and g) welding the non-porous backer to the microporous membrane at the first lengthwise weld area and the second lengthwise weld area.

8. A method for using the hybrid irrigation tube in claim 1, comprising regulating a supplied fluid at an inlet to the hybrid irrigation tube at a predetermined pressure to achieve plant-responsive irrigation, the predetermined pressure being within the first operational pressure range and outside the second operational pressure range.

9. A method for using the hybrid irrigation tube in claim 1, comprising regulating the supplied fluid at the inlet to the hybrid irrigation tube at a predetermined pressure to achieve amendment delivery, the predetermined pressure being within the second operational pressure range.

10. A method for adjusting a depth of the hybrid irrigation tube in claim 1, comprising:

disposing the hybrid irrigation tube in a field;

planting a crop proximate to the hybrid irrigation tube;

irrigating the crop via the microporous membrane;

determining a depth of the hybrid irrigation tube;

determining a depth of crop roots;

comparing the depth of the hybrid irrigation tube to the depth of the crop roots; and flushing the hybrid irrigation tube to increase the depth of the hybrid irrigation tube, the flushing using the at least one drip emitter.

11. The method for adjusting a depth of the hybrid irrigation tube presented in claim 10, wherein disposing the hybrid irrigation tube in the field is a surface application of the hybrid irrigation tube.

12. The method for adjusting a depth of the hybrid irrigation tube presented in claim 10, wherein disposing the hybrid irrigation tube in the field is a sub-surface application of the hybrid irrigation tube.

13. The hybrid irrigation tube of claim 1, wherein the microporous membrane includes polypropylene.

14. The hybrid irrigation tube of claim 1, wherein the microporous membrane includes polyester.

15. The hybrid irrigation tube of claim 14, wherein the non-porous backer includes polyester.

16. A method for using the hybrid irrigation tube in claim 1, comprising regulating the supplied fluid at the inlet to the hybrid irrigation tube at a predetermined pressure to achieve a flush of the hybrid irrigation tube, the predetermined pressure being within the second operational pressure range.

* * * * *